US007603774B2

(12) United States Patent
Facius et al.

(10) Patent No.: US 7,603,774 B2
(45) Date of Patent: Oct. 20, 2009

(54) COOLING TOWER WITH DIRECT AND INDIRECT COOLING SECTIONS

(75) Inventors: Timothy P. Facius, Ellicott City, MD (US); Frank T. Morrison, Crownsville, MD (US)

(73) Assignee: Baltimore Aircoil Company, Inc, Jessup, MD (US)

(*) Notice: Subject to any disclaimer, the term of this patent is extended or adjusted under 35 U.S.C. 154(b) by 0 days.

(21) Appl. No.: 12/317,233

(22) Filed: Dec. 22, 2008

(65) Prior Publication Data

US 2009/0133257 A1 May 28, 2009

Related U.S. Application Data

(62) Division of application No. 11/352,978, filed on Feb. 13, 2006, now Pat. No. 7,484,718.

(51) Int. Cl.
*B01F 3/04* (2006.01)

(52) U.S. Cl. .................... 29/890.03; 261/42; 261/64.1; 261/153; 261/160; 261/DIG. 11

(58) Field of Classification Search ............. 29/890.03, 29/890.035; 261/42, 53, 64.1, 152, 153, 261/158, 159, 160, 161, DIG. 11
See application file for complete search history.

(56) References Cited

U.S. PATENT DOCUMENTS 3,923,935 A * 12/1975 Cates ........................ 261/159
4,076,771 A * 2/1978 Houx et al. ................ 261/159
4,112,027 A * 9/1978 Cates ........................ 261/151
4,173,605 A * 11/1979 Long ......................... 261/109
4,315,873 A * 2/1982 Smith et al. ................ 261/158
4,683,101 A * 7/1987 Cates ........................ 261/146
5,435,382 A * 7/1995 Carter ....................... 165/110
5,724,828 A * 3/1998 Korenic ...................... 62/305
5,816,318 A * 10/1998 Carter ....................... 165/110
6,142,219 A * 11/2000 Korenic et al. ............. 165/110
6,213,200 B1 * 4/2001 Carter et al. ............... 165/285
6,598,862 B2 * 7/2003 Merrill et al. .............. 261/128
7,364,141 B2 * 4/2008 Brenneke et al. ........... 261/146
7,484,718 B2 * 2/2009 Facius et al. ............... 261/153

* cited by examiner

*Primary Examiner*—Scott Bushey
(74) *Attorney, Agent, or Firm*—Edward J. Brosius

(57) ABSTRACT

A mechanical draft cooling tower includes an air inlet and an air outlet. A liquid spray assembly is provided below the air outlet. A fill shell assembly is provided below the liquid spray assembly such that liquid can be sprayed onto the fill sheet assembly. An indirect heat exchange assembly is mounted beneath the fill sheet assembly. The indirect assembly usually comprises a series of coils through which a fluid to be cooled is circulated. A first air inlet is provided beneath the fill sheet assembly and includes a closing assembly. A second air inlet is provided beneath a top surface of the indirect assembly and includes a closing assembly.

12 Claims, 3 Drawing Sheets

114
112
118
116
130
132
136
122
120
139
128
159
150
149
142
152
124
126

COOLING TOWER WITH DIRECT AND INDIRECT COOLING SECTIONS

The present invention application is a Divisional of U.S. patent application Ser. No. 11/352,978, now U.S. Pat. No. 7,484,718, file on Feb. 13, 2006. The present invention relates generally to cooling towers, and more specifically, to an evaporative heat and mass exchanger with a coil module for evaporative closed circuit cooling or evaporative condensing.

BACKGROUND OF INVENTION

In an induced draft cross flow or counter flow cooling tower, a fan is mounted in the roof outlet of the tower. This fan draws or induces airflow inwardly into the cooling tower through a side wall or opposite side walls of the tower. Water or other evaporative liquid to be cooled is pumped to the top of the cooling tower structure and distributed through a series of spray nozzles. These spray nozzles emit a diffuse spray of water across the top of a fill media. Such fill media typically comprises a bundle of spaced parallel plastic sheets across each of which the water spray is dispersed and downwardly passed by gravity. The large surface area across which the water is dispersed on such sheets leads to cooling by the induced air flow directed between the sheets. The cold water is collected in a sump and then passed through to the desired cooling system, wherein it will become heated and then pumped back to the cooling tower.

An indirect heat exchange unit is provided beneath the bundle of fill sheets. Such unit is typically comprised of serpentine heat exchange conduits or coils. The hot fluid to be cooled enters the heat exchange conduits through an inlet header at the lower or bottom edge of the conduits with the cool fluid exiting the conduits through a header joining the upper ends of the conduits. Alternately, a vapor to be condensed enters the top of the conduits and as it travels downwardly through the conduits becomes condensed and liquefied and exits the bottom header. One such cooling tower apparatus is shown in U.S. Pat. No. 4,683,101. The cooling is provided by sensible cooling from the spray water on the outside of the conduits. Cooling air may or may not flow through the indirect heat exchange unit.

On occasion, such as during cold weather months, it is desired to operate such cooling towers in a dry mode without the use of water or other fluids being sprayed downwardly across the fill direct heat exchange section. In such an arrangement, it would be desirable to open the sides of a cooling tower adjacent the indirect cooling section to inflow air. Such an arrangement would optimize the performance of the air-cooled, non evaporative heat exchanger.

Coil shed cooling towers are also known, which consist of a cooling tower with the direct evaporative heat exchanger with fill section located directly above a non-ventilated indirect cooling or coil section. Little to no cooling air is drawn through the indirect section. Such coil sheds have little to no cooling capacity when operated without the spray water flowing downwardly over the direct cooling or fill section. Such limitation on the operation of the tower limits the application and utility for such towers as they typically cannot be operated dry as during the winter months in cold climates. Further, the maximum wet mode performance of the coil or indirect section is limited as no air enters this section of the cooling tower. The design of the coil shed cooling tower is such that this section is closed to air inlet. In such an arrangement, it would be desirable to open the sides of a cooling tower adjacent the indirect cooling section to inflow air. Such an arrangement would optimize the performance of the air-cooled, non evaporative heat exchanger. Referring now to FIG. 3, which shows a section of the cooling tower of FIG. 1, a sliding cover 125 or removable panel is provided which can be moved to cover air inlet 149 or the fill inlet section 139. Cover 125 can be moved manually or by motor control.

SUMMARY OF THE INVENTION

In one embodiment, the present invention provides a mechanical draft cooling tower comprising an air inlet and an air outlet. A liquid spray assembly adapted to spray liquid downwardly between the air inlet and the air outlet is provided. A fill sheet assembly is mounted beneath the liquid spray assembly to provide direct cooling of the liquid spray flowing downwardly onto the fill sheet assembly.

An indirect heat exchange assembly is mounted beneath the fill sheet assembly. The indirect heat exchange assembly usually comprises a series of coils, a collection of plates or other closed type indirect heat transferring assembly. The indirect heat exchange assembly is adapted to receive a fluid to be cooled and to outlet the fluid after cooling. Alternately, the indirect heat exchange assembly can receive a vapor to be condensed.

A first air inlet in a side of the cooling tower is provided beneath the fill sheet assembly. A first closing assembly is provided with the first air inlet whereby the first air inlet can be closed to inlet air. Such closing assembly usually comprises a louver or removable cover. A second air inlet in a side of the cooling tower is provided beneath a top surface of the indirect heat exchange assembly. A second closing assembly is provided with the second air inlet whereby the second air inlet can be closed to inlet air. The second air inlet typically comprises a louver assembly or a removable panel.

DETAILED DESCRIPTION OF PREFERRED EMBODIMENTS

Figure 1:
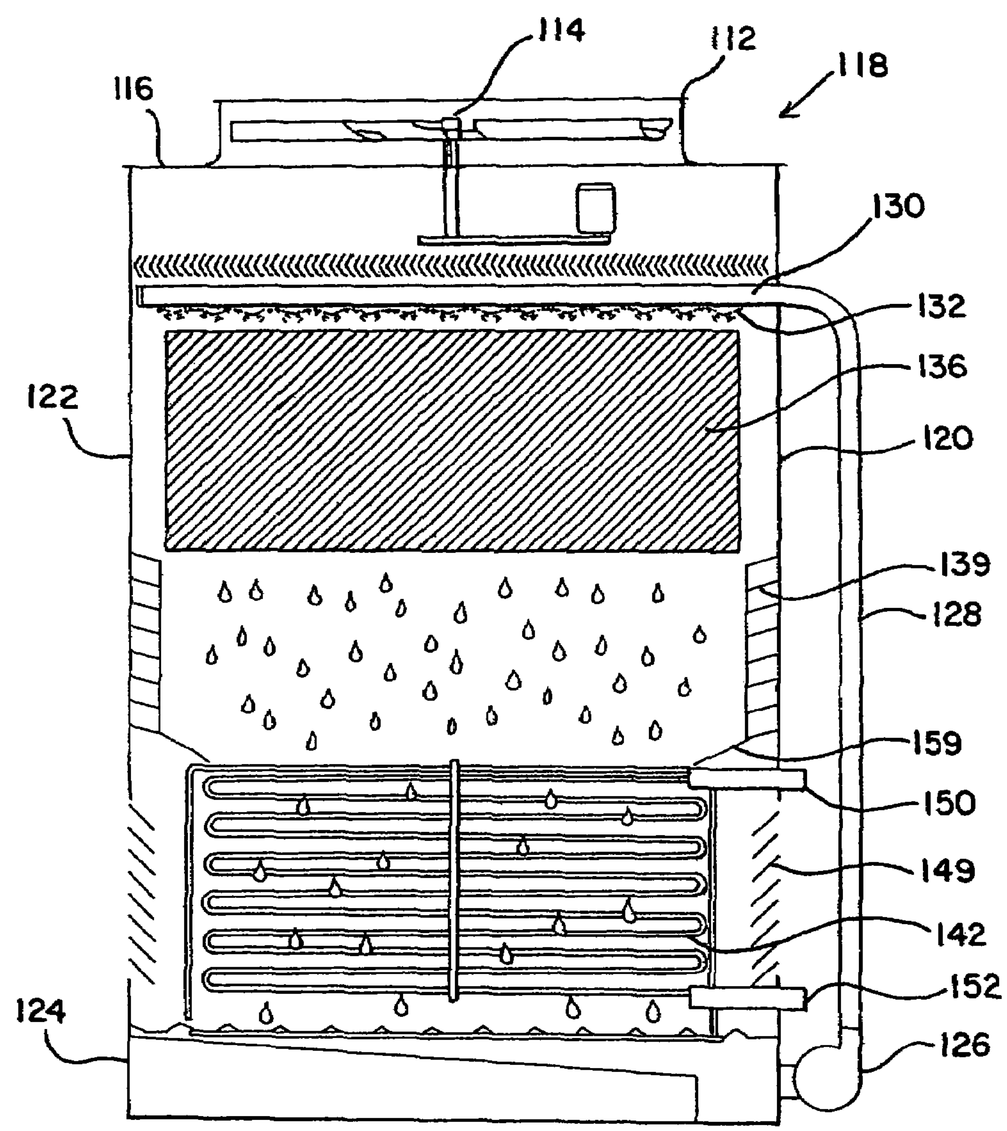
FIG. 1 is a side view in partial cross section of a cooling tower in accordance with a first embodiment of the present invention.

Referring now to FIG. 1 of the drawings, a cooling tower is shown generally at 118 and comprises an outlet fan enclosure 112 housing a fan 114 therein. Cooling tower 118 is of a generally rectangular or square shape, comprising an upper surface 116, and end walls 120 and 122. Fan 114 induces a draft upwardly and out of outlet fan enclosure 112, with air being drawn inwardly from cooling tower louver fill section opening 139 and indirect inlet section 149.

Cooling water is collected in collection sump 124 and is pumped upwardly via pump 126 and piping 128. Such cooling water then enters distribution pipe 130, spraying downwardly out of spray nozzles 132 onto fill section or direct cooling section 136. Fill section 136 comprises a plurality of plastic sheets that are stacked or hung within the direct cooling section of cooling tower 118. Typically such sheets are comprised of plastic material such as polyvinyl chloride or polypropylene, having a generally wavy or grooved pattern on both sides to aid in the spreading rundown and cooling of water exiting from spray nozzles 132.

A baffle arrangement 159 extends inwardly from end walls 120 and 122, as well as side walls of the cooling tower to assure that the water exiting fill section 136 is distributed evenly and completely across the exposed area of indirect cooling section coil 142. Such coil 142 usually comprises the plurality of coil sections, each of which extends from, when the unit is operating as a fluid cooler, a coil inlet header 152, and exiting at a coil outlet header 150. When the unit is operating as a condenser, the fluid would enter header 150 as a vapor that requires condensing. The condensed liquid would exit through header 152. In either case, the cooling is accomplished by the water flow downwardly from fill section 136 across the coil section 142.

Fill section inlet 139 can be comprised of a louver arrangement, such as shown in FIG. 1, or removable covers or caps that can close off inlet air from entering the section of the cooling tower beneath fill section 136. This is an option given to the operator of the cooling tower to choose whether or not air is to be allowed to enter through fill section of louvers or opening 139.

Figure 3:
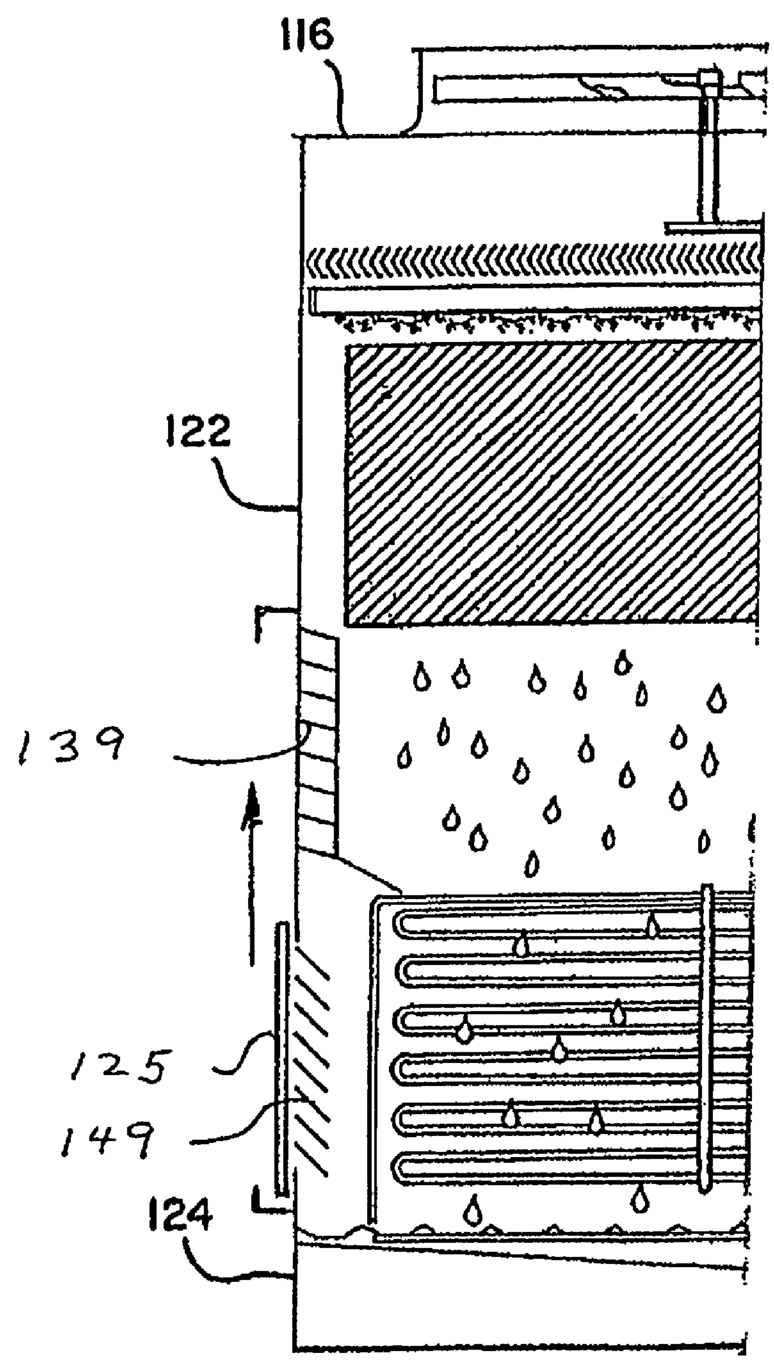
FIG. 3 is a side view in partial cross section of a cooling tower in accordance with a third embodiment of the present invention.

Further, air inlet 149 includes a louver or a similar panel or cover, which can close air inlet opening 149 to inlet air. This again gives the operator of the cooling tower an option whether or not such inlet air is desired. In such an arrangement, it would be desirable to open the sides of a cooling tower adjacent the indirect cooling section to inflow air. Such an arrangement would optimize the performance of the air-cooled, non evaporative heat exchanger. Referring now to FIG. 3, which shows a section of the cooling tower of FIG. 1, a sliding cover 125 is provided which can be moved to cover air inlet 149 or the fill inlet section 139. Cover 125 can be moved manually or by motor control.

It can be seen that in the embodiment shown in FIG. 1, virtually all of air inlet 139 is located beneath fill section 136. This can be an optional arrangement with the portion of air inlet 139 in other embodiments being allowed to extend upwardly toward and into lateral spacing even with the portion of fill section 136.

Similarly, air inlet 149 is seen to be laterally aligned such that a majority of the air inlet 149 is located beneath the top of indirect coil cooling section 142.

Figure 2:
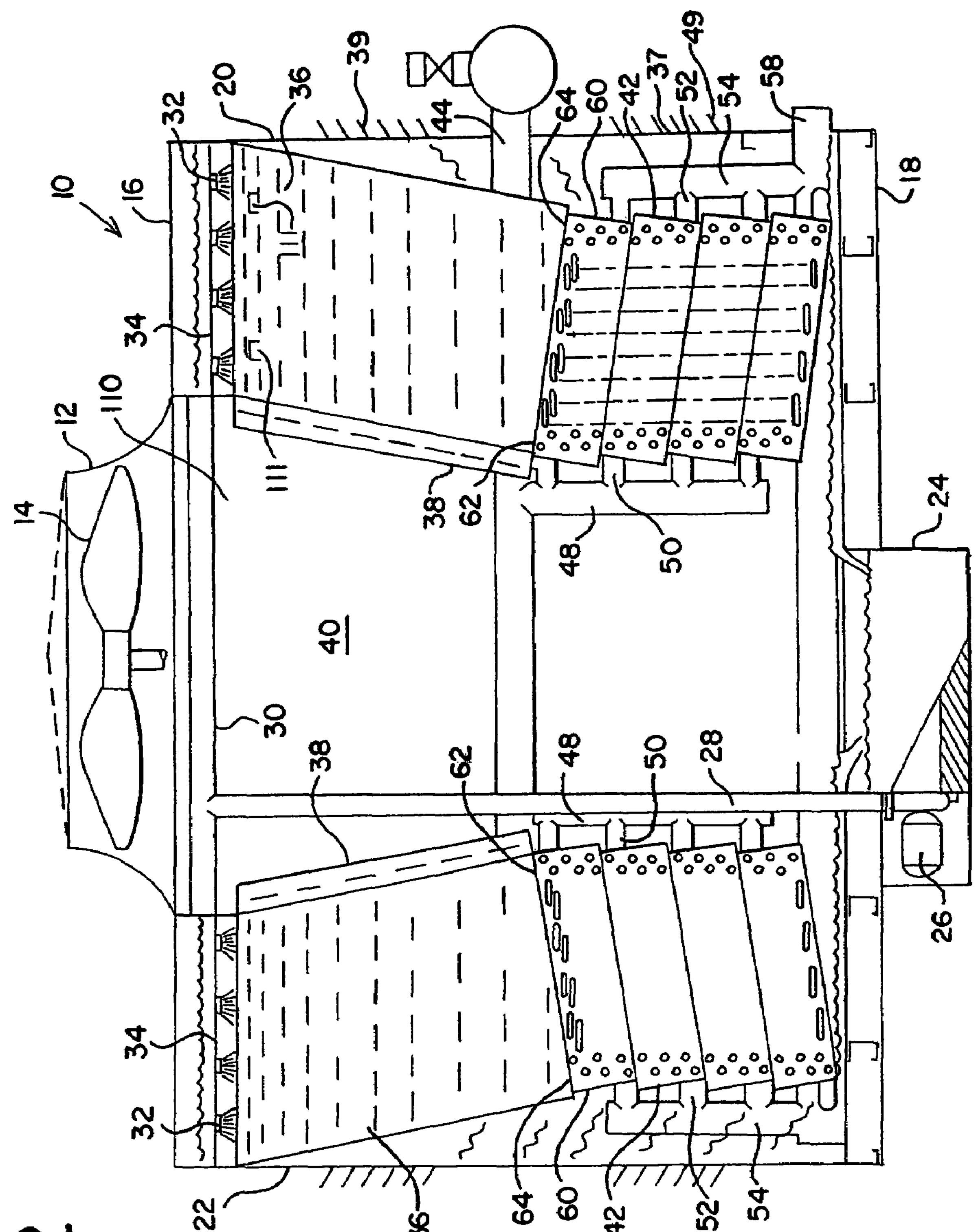
FIG. 2 is a side view in partial cross section of a cooling tower in accordance with a second embodiment of the present invention.

Referring now to FIG. 2 of the drawings, a cooling tower is shown generally at 10 comprising an outlet fan enclosure 12, which houses a fan 14 therein. Upper surface 16 is seen to comprise a structural roof of cooling tower 10, with side walls 110 and end wall 20 and 22, comprising a generally rectangular shape of cooling tower 10. Base section 18 is seen to be a structural support for the cooling tower, with sump 24 collecting the water from the cooling tower and pump 26 being utilized to pump the water to be cooled upwardly through piping 28 to distribution pipe 30. Distribution pipe 30 is seen to extend into distribution containers 34, with spray nozzles 32 extending from the bottom of distribution container 34.

In the cross-flow cooling tower arrangement shown in FIG. 2, two separate distribution containers 34 are shown, with one being at end wall or air inlet 20 and the other being at end wall or air inlet 22. As each section of the cooling tower is identical, only one will be described. Fill bundle 36 is seen to comprise a plurality of plastic sheets hung from beams 111 supported at ends with brackets attached to end walls 110. Each of the sheets of fill bundle 36 is comprised of plastic material such as polyvinyl chloride or polypropylene, having a generally wavy and grooved pattern on both sides to aid in the spreading, rundown and cooling of water exiting from spray nozzles 32. Drift eliminator 38 assures the cooling water in fill section 36 does not enter air inlet chamber 40, which is centrally located in cooling tower 10. Generally, drift eliminator 38 comprises a series of closely spaced plastic louvers.

A coil heat exchanger assembly 42 is located beneath each fill bundle 36. Fluid to be cooled enters cooling tower 10 through conduit 58 and flows upwardly through manifold 54 and through manifold inlets 52 into each coil assembly module 60 of coil heat exchanger 64. Cold liquid, having passed through coil heat exchangers 42, exits each coil assembly module 60 through outlet 50 into outlet manifold 48 and exits cooling tower 10 through outlet conduit 44. In an alternative embodiment, a single coil assembly module 60 would be utilized. Alternately, when the unit is operating as a condenser, the fluid enters conduit 44 as a vapor that requires condensing. The condensed liquid would exit through conduit 58.

The air inlet side 37 of end wall 20 is seen to include louvers 49. Such louvers may be replaced with a panel or other removable piece. However, the function of louvers 49 or the replaceable panel is the same in that air inlet through air inlet 37 may be either permitted or closed, depending on intended operation of cooling tower 10. It is seen that the majority of air inlet 37 and louvers 49 are laterally spaced beneath the top of coil assembly 42.

Similarly, air inlet louvers 39 are placed in end wall 20 adjacent fill section 36. Such louvers can be replaced with a panel or other removable piece, but the function is the same, depending on the intended operation of cooling tower 10. Such louvers may be closed or panel piece inserted to close air inlet through the inlet section adjacent fill section 36.

What is claimed is:

1. A method of assembling a mechanical draft cooling tower comprising the steps of:

providing a cooling tower structure having an air outlet at a top section of the cooling tower structure, providing a liquid spray assembly adapted to spray liquid downwardly from below the air outlet, mounting a fill sheet assembly within the cooling tower structure below the liquid spray assembly, mounting an indirect heat exchange assembly beneath the fill sheet assembly, the indirect heat exchange assembly adapted to receive a fluid to be cooled and to outlet the fluid after cooling, providing a first air inlet in a side of the cooling tower structure, a majority of the first air inlet being located beneath the fill sheet assembly, providing a first closing assembly whereby the first air inlet can be substantially closed to inlet air, providing a second air inlet in a side of the cooling tower structure, a majority of the second air inlet being located beneath a top surface of the indirect heat exchange assembly, and providing a second closing assembly whereby the second air inlet can be substantially closed to inlet air.

2. The method of claim 1 wherein the first closing assembly is comprised of louvers that can be opened and closed.

3. The method of claim 1 wherein the first closing assembly is comprised of a panel that can be installed or removed from the cooling tower side.

4. The method of claim 1 wherein the second closing assembly is comprised of louvers that can be opened and closed.

5. The method of claim 1 wherein the second closing assembly is comprised of a panel that can be installed or removed from the cooling tower side.

6. The method of claim 1 wherein the fill sheet assembly is removable.

7. The method of claim 1 wherein the fill sheet assembly comprises two separate fill sections, one fill section adjacent one side of the cooling tower and the other fill section adjacent an opposite side of the cooling tower.

8. The method of claim 1 wherein the indirect heat exchange assembly comprises two separate heat exchange sections, one heat exchange section adjacent one side of the cooling tower and the other fill section adjacent an opposite side of the cooling tower.

9. The method of claim 1 wherein the fill sheet assembly comprises two separate fill sections, one fill section adjacent one side of the cooling tower and the other fill section adjacent an opposite side of the cooling tower, wherein the indirect heat exchange assembly comprises two separate heat exchange sections, one heat exchange section adjacent one side of the cooling tower and the other fill section adjacent an opposite side of the cooling tower, and wherein the air outlet is located above and between the two separate fill sections.

10. The method of claim 1 wherein air flow is drawn across the fill section and upwardly out the air outlet.

11. The method of claim 1 wherein air flow is drawn across the indirect exchange section and upwardly out the air outlet.

12. The method of claim 1 further providing a baffle arrangement above the indirect heat exchange assembly, the baffle arrangement directing the spray liquid into the indirect heat exchange assembly.

* * * * *